June 14, 1949.  G. H. BROWN ET AL  2,473,328
LINE BALANCE CONVERTER
Filed Dec. 19, 1944

INVENTORS
George H. Brown
& Oakley M. Woodward, Jr.
BY
C D Tuska
ATTORNEY

Patented June 14, 1949

2,473,328

UNITED STATES PATENT OFFICE 2,473,328

LINE BALANCE CONVERTER

George H. Brown and Oakley M. Woodward, Jr., Princeton, N. J., assignors to Radio Corporation of America, a corporation of Delaware Application December 19, 1944, Serial No. 568,844

11 Claims. (Cl. 178—44)

This invention relates to line balance convertor systems, for use in transferring radio frequency power between balanced and unbalanced circuits or lines. The term "balanced" is used to designate a circuit or line including two conductors which are electrically symmetrical with respect to a neutral or ground point. The term "unbalanced" refers to a line or circuit which is electrically unsymmetrical with respect to its ground point. For example, a concentric transmission line with a single inner conductor and a grounded outer conductor is unbalanced. A dipole radiator, comprising two elements extending in opposite directions from a neutral point and fed at that point so that current is flowing into one element while an equal current flows out of the other, is balanced. It is frequently necessary to couple an unbalanced line or source to a balanced load, or vice versa, and line balance convertors are used for this purpose. Typical prior art line balance convertors are described on page 855 of Radio Engineering Handbook, F. E. Terman, published by McGraw-Hill Book Company, 1943.

It is the principal object of the present invention to provide improved line balance convertor systems capable of efficient power transfer throughout a wide band of radio frequencies.

Another object of the invention is to provide line balance convertor systems which maintain accurate balance, independently of frequency.

A further object of this invention is to provide line balance convertors which are structurally simple, rugged, and easily designed to fulfill broad-band performance requirements.

Still another object is to provide systems of the described type wherein the balanced line terminals are effectively in parallel with each other, rather than in series.

Figure 1:
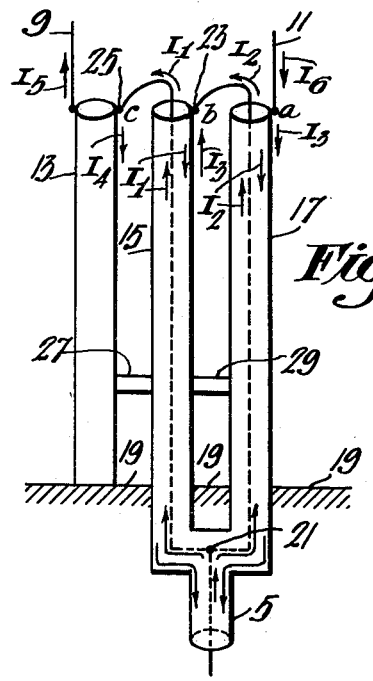
Figure 2:
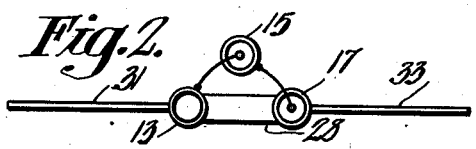
Figure 3:
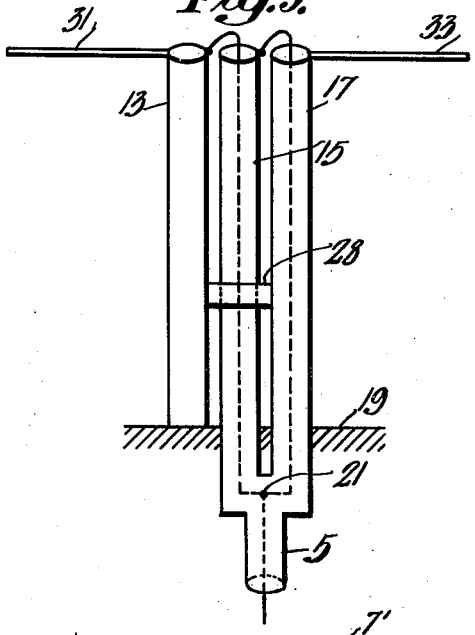
Figure 4:
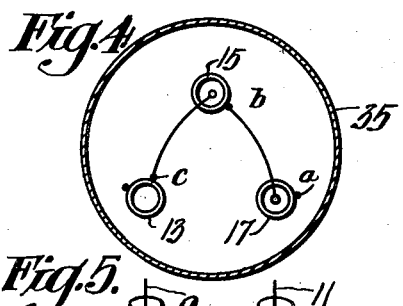
Figure 5:
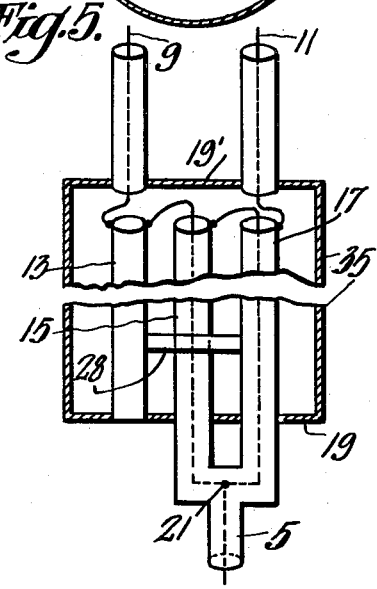
Figure 6:
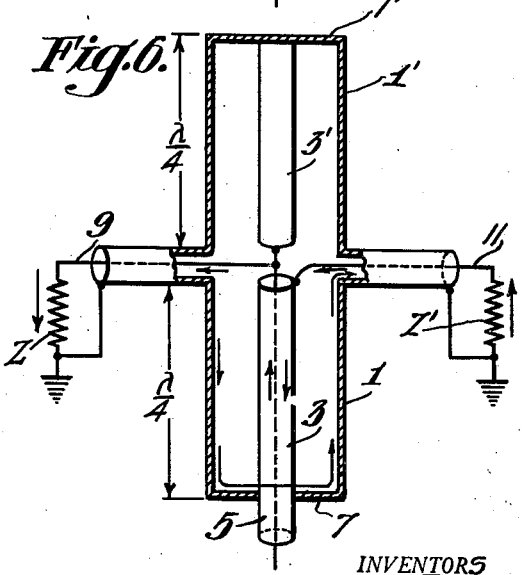

These and other objects will become apparent to those skilled in the art upon consideration of the following description, with reference to the accompanying drawing, of which Figure 1 is a schematic elevation of one embodiment of the invention, Figures 2 and 3 are schematic views in plan and elevation respectively of a modified form of the invention, Figures 4 and 5 are schematic views in plan and elevation respectively of a modification of the structure of Figures 2 and 3, and Figure 6 is a sectional elevation of a typical prior art line balance convertor.

Referring first to Figure 6, one well-known type of line balance convertor includes a cylindrical conductive sleeve 1 surrounding a quarter wavelength section 3 at the end of a coaxial transmission line 5. The line 5 comprises the unsymmetrical or unbalanced circuit of the convertor. The sleeve 1 is connected to the line section 3 by a conductive disc 7. A pair of transmission lines 9 and 11 are connected to the inner and outer conductors respectively of the line section 3.

The outer conductor of the line 3 cooperates with the sleeve 1 to act as a short-circuited quarter wave line connected across the line 11. In order to maintain balance at frequencies other than resonance, (i. e. that at which the line section 3 is one-quarter wavelength), the line 9 is shunted by a quarter wave stub comprising a sleeve 1' and an inner conductor 3', having the same dimensions respectively as the sleeve 1 and the outer conductor of the line 3. The members 1' and 3' are connected by a disc 7'.

In the operation of the system of Figure 6, assume that the line 5 is fed by a radio frequency source, not shown, and that equal loads, Z and Z', are connected to the lines 9 and 11. When current is flowing upward on the inner conductor of the line 3, an equal current must flow downward on the inner surface of the outer conductor of the line 3. The current on the inner conductor cannot flow down the conductor 3' because the shorted quarter wave stub 1', 3' presents a high impedance. Therefore, the current flows out on the inner conductor of 9. The return current, on the inner surface of the outer conductor of line 9 flows circumferentially around the wall of the outer conductor and converges on the inner surface of the outer conductor of line 11, through the load Z' and back to the outer conductor of line 3. The current cannot flow into the high impedance of the stub 1, 3 and must go back down the inner surface of the outer conductor of line 3. Thus the same current flows through both loads Z and Z', but in opposite directions, i. e. toward ground in one load while away from ground in the other. The loads Z and Z' are effectively in series with each other across the input.

At frequencies other than resonance, the stubs 1, 3 and 1', 3' will not present substantially infinite impedances, so that some current will flow into them. However, since they are identical, and one shunts each of the lines 9 and 11, the load currents will still be equal and opposite. Currents differ from input current, however, if loads are reactive and of proper sign, load currents may be more than input current.

Referring to Figure 1, one embodiment of the present invention comprises three tubular conductive members 13, 15 and 17 supported at equal intervals on a ground screen 19, parallel to each other and perpendicular to the screen 19. The tubular members 15 and 17 are the outer conductors of a pair of coaxial lines, connected together through a T coupling 21 below the screen 19 to the coaxial line 5 which is the unbalanced circuit of the device. The members 13, 15 and 17 all extend the same distance, approximately one-quarter wavelength from the screen 19. The inner conductor of the line 17 is connected at the point 23 to the end of the outer conductor 15. The inner conductor of the line 15 is similarly connected to the end 25 of the member 13. The balanced line conductors 9 and 11 are connected to the ends of the tubular members 13 and 17 respectively. The conductors 9 and 11 may be parallel open-wire conductors, or each may be a coaxial line, as in the system of Figure 6.

The operation of the system of Figure 1 may be explained mathematically by referring to the following equations in which the currents are indicated by the reference characters applied to the drawing:

At (a)  $I_6 = I_2 + I_3$  (1)
At (b)  $I_2 + I_3 + I_4 = I_1$  (2)
At (c)  $I_1 = I_4 + I_5$  (3)

Substituting (3) in (2)

$$I_2 + I_3 + I_4 = I_4 + I_5$$ (4)

or $$I_2 + I_3 = I_5$$ (5)

But comparing (1) and (5)

$$I_6 = I_5$$

A similar non-mathematical explanation is as follows: Assuming that radio frequency energy is fed in through the line 5, the voltages at the ends of the lines 15 and 17 will be in phase provided the lines 15 and 17 are of equal lengths and provided further that the lines terminate in equal impedances. The balanced line conductors 9 and 11 are connected to the inner conductor of the line 15 and the outer conductor of the line 17, and are, therefore, fed out of phase, or push pull. The input current on the line 5 is divided between the lines 15 and 17, one-half flowing up each inner conductor when the current is up in the line 5. The current on the inner conductor of the line 17 flows down the inside of the outer conductor of the line 15, balancing the current which flows up from the line 5 on the inner conductor of the line 15, across to the point 25, and out on the line 9. The current flowing in from the line 11 goes down the inside of the outer conductor of the line 17. The outer conductors 15 and 17 act as a parallel wire line, short-circuited by the ground screen 19, and offer a high impedance to the flow of current down the outside surfaces. The member 13 and outer conductor 15 function similarly as a shorted parallel line. The reactances presented by these stub lines may be adjusted for the purpose of impedance matching by means of movable shorting bars 27 and 29 connecting the conductors 13, 15 and 17 respectively.

Figures 2 and 3 show a modified form of the invention wherein the line balance convertor functions as a support for a dipole antenna. Radiator elements 31 and 33 are secured to the upper ends of the elements 13 and 17 respectively, which are the balanced terminals of the convertor. The structure is similar to that shown in Figure 1, with the exception that the element 15 is positioned behind the plane of the elements 13 and 17. This enables the inner ends of the dipole elements 31 and 33 to be brought close together, which is necessary for correct operation of the dipole at frequencies at which the spacing of the elements 13, 15 and 17 is an appreciable fraction of a wavelength. A single shorting bar 28 may be provided between the elements 13 and 17, instead of the two bars 27 and 29 of the system of Figure 1.

Referring to Figures 4 and 5, the convertor may be surrounded by a conductive shielding cylinder 35. The elements 13, 15 and 17 are preferably disposed as in the system of Figure 2. The ground screen 19 takes the form of a disc closing the lower end of the shield 35, and a similar disc 19' closes the upper end. The balanced lines 9 and 11 may be provided with coaxial shields, grounded to the upper disc 19'. The operation of the system of Figure 4 is the same as that of the systems of Figures 1 and 2.

Summarizing briefly the above description, the invention comprises an improved line balance convertor in which the unbalanced line is connected to two coaxial line sections in parallel. The balanced lines are connected to the inner conductor of one coaxial line section and to the outer conductor of the other. A third conductor, similar to the outer conductors of the coaxial line sections, is connected to one of the balanced lines to equalize the reactances to ground of the balanced lines. An important feature of the described arrangement is the fact that the balanced lines are electrically in parallel with each other across the unbalanced line.

We claim as our invention:

1. A line balance convertor including a substantially plane conductive body, a pair of coaxial transmission line sections extending through said body at right angles to the surface thereof with their upper ends at points approximately one-quarter wavelength distant therefrom at the mean frequency of operation of the system, a cylindrical conductor substantially identical with the outer conductors of said line sections connected to said body and extending therefrom parallel to said line sections, a coaxial line connected to the lower ends of said line sections in parallel, a balanced line including two conductors connected respectively to the upper end of said cylindrical conductor and to the upper end of the outer conductor of one of said coaxial line sections, means connecting the inner conductor of said one line section to the outer conductor of the other of said line sections, and means connecting the inner conductor of said other line section to the upper end of said cylindrical conductor.

2. The invention as set forth in claim 1, including short-circuiting bars connected between the outer conductors of said pair of coaxial line sections and between the outer conductor of said one line section and said cylindrical conductor.

3. The invention as set forth in claim 1, wherein said coaxial line sections and said cylindrical conductor intersect the plane of said first-mentioned conductive body substantially at the apices of a triangle.

4. The invention as set forth in claim 1 wherein said coaxial line sections and said cylindrical conductor are disposed in a generally triangular formation on the surface of said conductive plane, and a short-circuiting bar is provided connecting said one coaxial line section to said cylindrical conductor.

5. The invention as set forth in claim 1, wherein said coaxial line sections and said cylindrical conductor are disposed in a substantially triangular formation on the surface of said conductive plane and a conductive shield enclosing said members and connected to said plane.

6. A combined line balance convertor and dipole structure including a substantially plane conductive body, a pair of coaxial transmission line sections extending through said body at right angles thereto, a cylindrical conductor substantially identical with the outer conductors of said line sections connected to said body and extending therefrom parallel to said line sections, a coaxial line connected to the lower ends of said line sections in parallel, a dipole radiator comprising two collinearly disposed conductive rods connected at their nearer ends respectively to the upper end of said cylindrical conductor and to the upper end of the outer conductor of one of said coaxial line sections, means connecting the inner conductor of said one line section to the outer conductor of the other of said line sections, and means connecting the inner conductor of said other line section to the upper end of said cylindrical conductor.

7. The invention as set forth in claim 6, wherein said line sections and said cylindrical conductor are substantially equidistant from one another.

8. The invention as set forth in claim 6, wherein said line sections and said cylindrical conductor are substantially equidistant from one another and a shorting bar is provided connecting the said one line section and said cylindrical conductor.

9. A line balance convertor including a substantially plane conductive body, a pair of coaxial transmission line sections extending through said body with their upper ends at points approximately one quarter wavelength distant therefrom at the mean frequency of operation of the system, a cylindrical conductor substantially identical with the outer conductors of said line sections connected to said body and extending therefrom parallel to said line sections, a coaxial line connected to the lower ends of said line sections in parallel, a balanced circuit including two conductors connected respectively to the upper end of said cylindrical conductor and to the upper end of the outer conductor of one of said coaxial line sections, means connecting the inner conductor of said one line section to the outer conductor of the other of said line sections, and means connecting the inner conductor of said other line section to the upper end of said cylindrical conductor.

10. A line balance convertor including a coaxial transmission line for connection to an unbalanced circuit, a pair of equal length coaxial line sections connected in parallel with each other to said coaxial line, each of said coaxial lines having an inner conductor and an outer conductor, and a pair of conductors adapted to operate in a balanced circuit, a conductive element substantially parallel to both of said equal length coaxial line sections and coterminous therewith at the ends remote from the parallel connection, said element and the outer conductors of said equal length coaxial line sections being short circuited together at a substantially equal distance from the coterminous ends thereof, there being connected at the coterminous ends of said coaxial line sections and said conductive element, one balanced circuit conductor to the outer conductor of one said coaxial line section, the inner conductor of said one coaxial line section to the outer conductor of the other said coaxial line section and the inner conductor of the other said coaxial line section to the said conductive element, and to the other said balanced circuit conductor.

11. The line balance convertor claimed in claim 10, said coaxial transmission line sections and said conductive element being short circuited at a distance substantially equal to one quarter wave-length from the coterminous ends thereof at the mean operating frequency of the system.

GEORGE H. BROWN.
OAKLEY M. WOODWARD, Jr.

REFERENCES CITED

The following references are of record in the file of this patent:

UNITED STATES PATENTS

| Number | Name | Date |
| --- | --- | --- |
| 2,249,963 | Lindenblad | July 22, 1941 |
| 2,297,516 | Walter | Sept. 29, 1942 |